US006830258B2

(12) United States Patent
Foley

(10) Patent No.: US 6,830,258 B2
(45) Date of Patent: Dec. 14, 2004

(54) BICYCLE SIDECAR

(76) Inventor: Michael John Foley, 44 Townsend Rd., West Groton, MA (US) 01472

( * ) Notice: Subject to any disclaimer, the term of this patent is extended or adjusted under 35 U.S.C. 154(b) by 0 days.

(21) Appl. No.: 10/438,802

(22) Filed: May 15, 2003

(65) Prior Publication Data

US 2004/0026889 A1 Feb. 12, 2004

Related U.S. Application Data

(60) Provisional application No. 60/380,768, filed on May 15, 2002.

(51) Int. Cl.[7] .............................................. B62K 27/12
(52) U.S. Cl. ...................................................... 280/203
(58) Field of Search ................................ 280/202, 203, 280/288.4, 473; 180/218, 219, 209

(56) References Cited

U.S. PATENT DOCUMENTS

| | | | | |
|---|---|---|---|---|
| 4,378,121 A | * | 3/1983 | Rans | 280/203 |
| 4,385,770 A | * | 5/1983 | Mitchell | 280/203 |
| 4,477,097 A | * | 10/1984 | Hayes | 280/203 |
| 5,238,258 A | * | 8/1993 | Michaud | 280/203 |
| 5,248,158 A | * | 9/1993 | Ellard | 280/203 |
| 5,292,142 A | * | 3/1994 | Vitarelli | 280/203 |
| 5,297,808 A | * | 3/1994 | Ellard | 280/203 |
| 6,311,997 B1 | * | 11/2001 | Lepley | 280/203 |
| 6,508,483 B1 | * | 1/2003 | Frank | 280/203 |

* cited by examiner

Primary Examiner—Lesley D. Morris
Assistant Examiner—Matthew Luby
(74) Attorney, Agent, or Firm—Joseph Stecewycz

(57) ABSTRACT

A sidecar assembly includes a support body assembly for releasable attachment to a bicycle or other mobile device. The attachment is provided by a rear actuator arm assembly, a front actuator arm assembly, and a rear stabilizer assembly, each attachment assembly having at least one hinged connection to allow for movement of the sidecar relative to the mobile device. The sidecar further includes a support body with a rear wheel and a front caster wheel assembly configured such that most of the mass of the support body and sidecar passenger lies over the wheels and is not coupled to the mobile device.

1 Claim, 10 Drawing Sheets

BICYCLE SIDECAR

CROSS REFERENCE TO RELATED APPLICATION

The present Application is related to Provisional Patent Application Ser. No. 60/380,768 entitled "Bicycle sidecar" and filed 15 May 2002.

FIELD OF THE INVENTION

The present invention relates to sidecars and, in particular, to an apparatus and method for attaching a sidecar to a powered vehicle such as a bicycle.

BACKGROUND OF THE INVENTION

Bicycle sidecars are known in the present state of the art. For example, U. S. Pat. No. 4,378,121 issued to Rans discloses a sidecar with a frame having three attachment ends. U. S. Pat. No. 5,248,158 issued to Ellard discloses a sidecar frame assembly joined by two connecting assemblies. U. S. Pat. No. 5,292,142 issued to Vitarelli discloses a bicycle sidecar having four elongated mounting members. U. S. Pat. No. 6,311,997 issued to Lepley discloses a sidecar configuration utilizing a single U-shaped tube. However, the present state of the art does not appear to disclose a sidecar configuration which provides for safe and reliable operation on various types of terrain.

SUMMARY OF THE INVENTION

A sidecar assembly is disclosed which includes a support body assembly for releasable attachment to a bicycle or other mobile device. The attachment is provided by a rear actuator arm assembly, a front actuator arm assembly, and a rear stabilizer assembly, each attachment assembly having at least one hinged connection to allow for movement of the sidecar relative to the mobile device. In alternative embodiments, ball joints or other universal-type joints can be used in place of one or more of the hinged connections. The sidecar assembly includes a passenger seat and a support body with a rear wheel and a front caster wheel assembly configured such that most of the mass of the support body and sidecar passenger lies over the wheels and is not coupled to the mobile device. The sidecar assembly may also include a roll bar, a safety harness or seat belt system, a rear storage compartment and utilizes a roll bar hinge assembly and a nose hinge assembly for mating with the rear and front actuator arm assemblies respectively.

BRIEF DESCRIPTION OF THE DRAWINGS

Other objects and advantages of the present invention will be more readily apparent from the following detailed description when read in conjunction with the accompanying drawings in which.

DETAILED DESCRIPTION OF THE INVENTION

Figure 1:
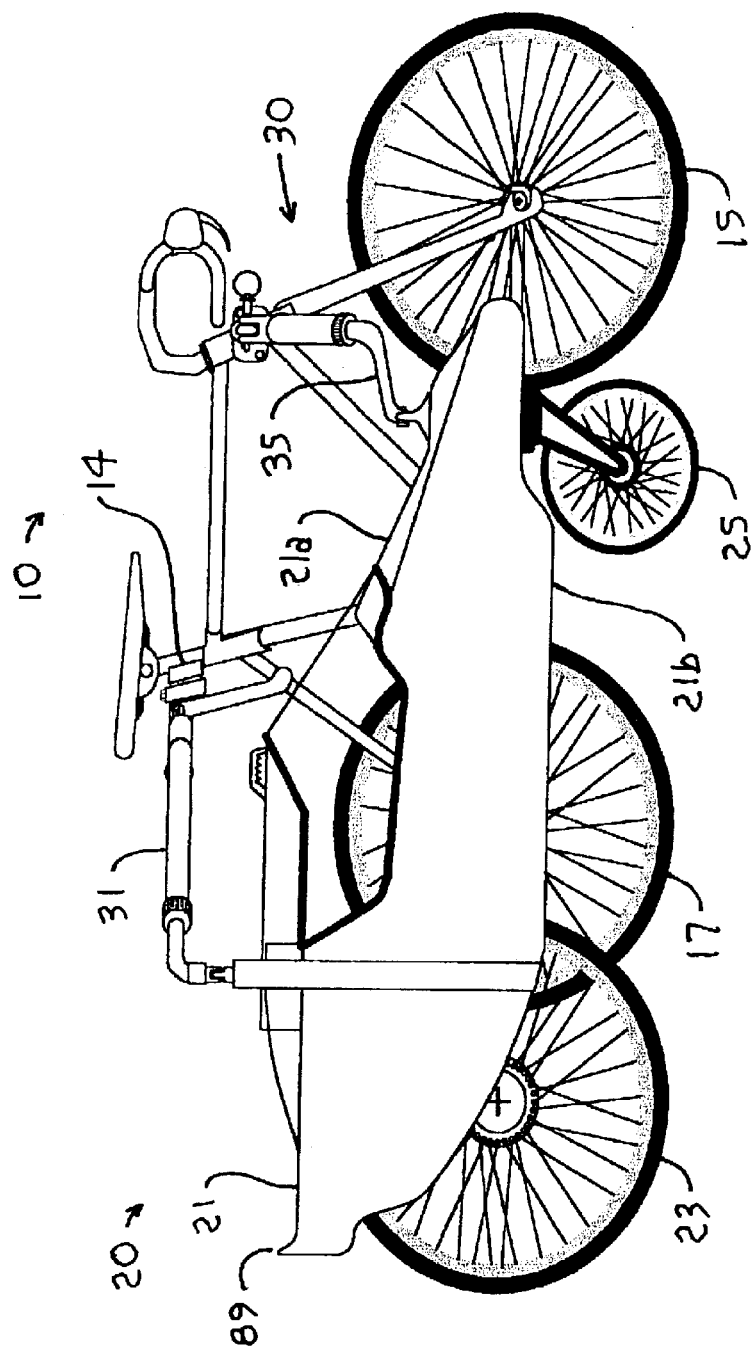
FIG. 1 is an illustrative diagram showing a side view of a conventional bicycle attached to a sidecar with a rear actuator arm assembly, a front actuator arm assembly, and a rear stabilizer assembly in accordance with the present invention.
Figure 2:
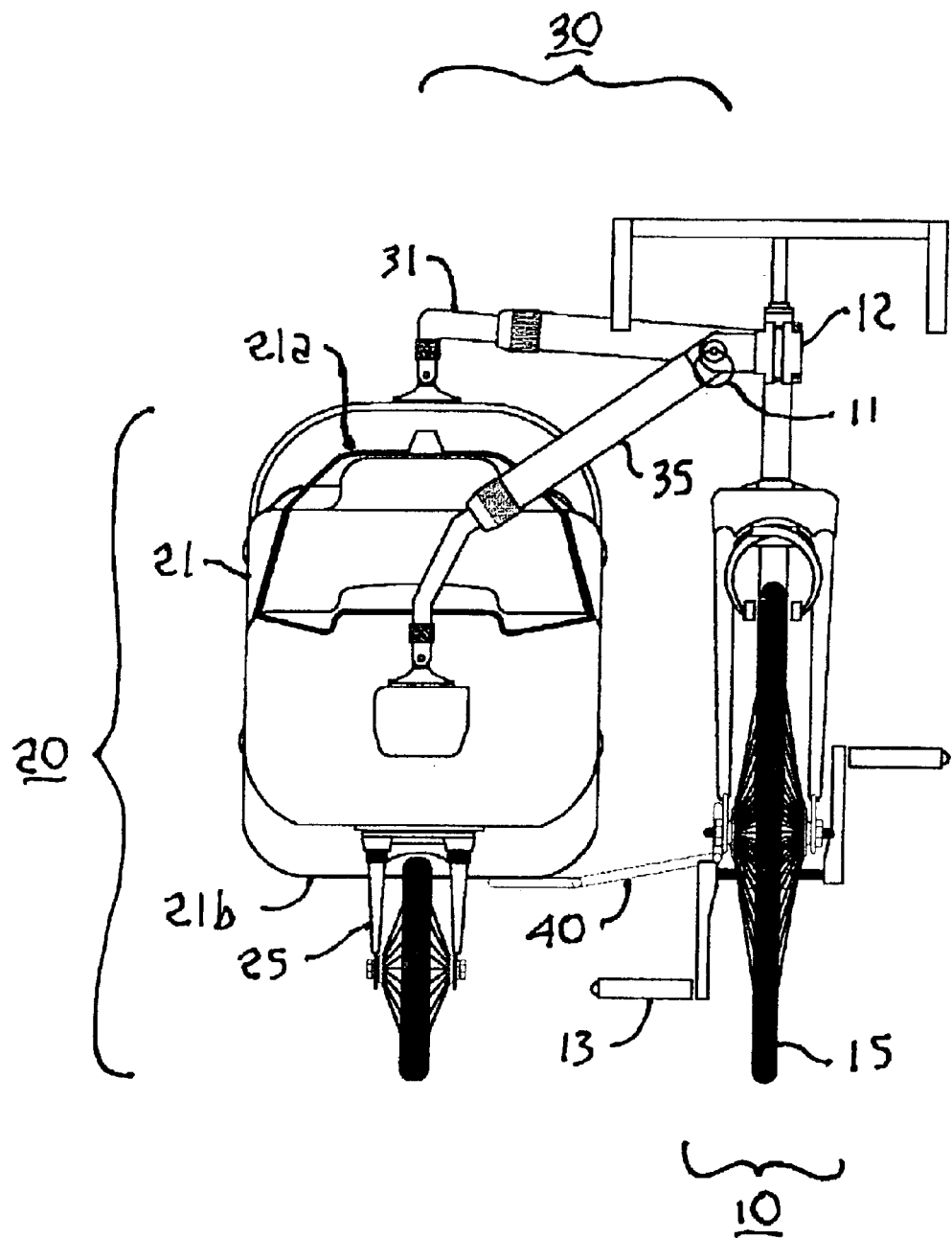
FIG. 2 is a front view of the bicycle and sidecar of FIG. 1 in a standing configuration.

There is shown in FIGS. 1 and 2 a conventional bicycle 10 attached to a support body assembly 21 by an articulation system 30. The support body assembly 21 and the articulation system 30 form a sidecar assembly 20. In a typical application, a rider (not shown) is seated on the bicycle 10, or other mobile device, providing motive power and one or two passengers (not shown) ride in the sidecar assembly 20. The support body assembly 21 includes a rear body wheel 23 and a front caster assembly 25, described in greater detail below.

Figure 3:
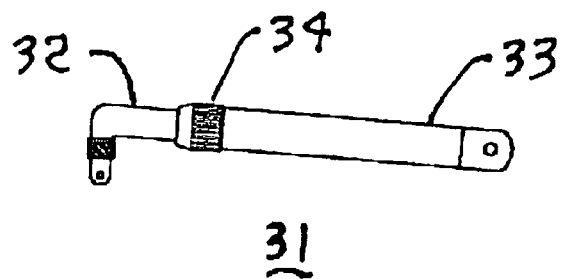
FIG. 3 is a detail view of the rear actuator arm assembly of FIG. 1.

The articulation system 30 includes a rear actuator arm assembly 31, a front actuator arm assembly 35, and a rear stabilizer assembly 40. As shown with additional reference to FIG. 3, the rear actuator arm assembly 31 includes a rear actuation tube 32, a rear actuation compression tube 33, and a rear collar 34. The rear actuation tube 32 is releasably attached to an upper surface 21a of the support body assembly 21 by a hinge configuration, the rear actuation compression tube 33 is releasably attached to the bicycle 10 by another hinge configuration, and the rear collar 34 loosens and tightens the rear compression tube 33 onto the rear actuation tube 32 to allow for extension and shortening of the rear actuator assembly 31 as desired to position the support body assembly 21 relative to the bicycle 10.

Figure 4:
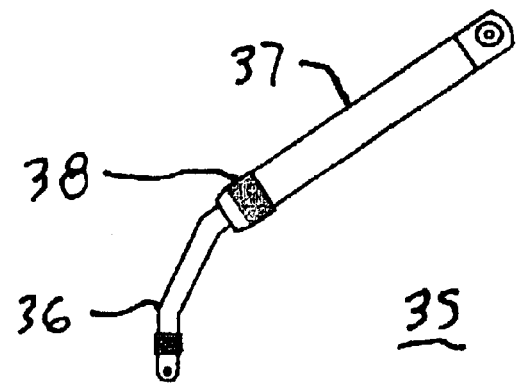
FIG. 4 is a detail view of the front actuator arm assembly of FIG. 1.

With additional reference to FIG. 4, the front actuator arm assembly 35 includes a front actuation tube 36, a front actuation compression tube 37, and a front collar 38. The front actuation tube 36 is releasably attached to the upper surface 21a of the support body assembly 21 by a hinge configuration, the front actuation compression tube 37 is releasably attached to the bicycle 10 by another hinge configuration, and the front collar 38 loosens and tightens the front compression tube 37 onto the front actuation tube 36 to allow for extension and shortening of the front actuator assembly 35 as desired to position the support body assembly 21 relative to the bicycle 10. The hinged attachments of the rear actuator arm assembly 31 and the front actuator arm assembly 35 thus allow the support body assembly 21 to articulate from side to side in turns, in mimicry of the natural lateral motion of the bicycle 10. This configuration further allows for the releasable attachment of essentially any bicycle frame type to the sidecar assembly 20 by the use of hinged alignment clamps 12 and 14, as is well known in the relevant art. Preferably, each of the hinged alignment clamps 12 and 14 at the bicycle 10 include a locking detent pin 11 that allows for quick disconnection from the bicycle 10 when the sidecar 20 is not being used. This avoids the need to disassemble the bicycle-attaching clamps (not shown) and lose the established bicycle-to-sidecar alignments.

Figure 5:
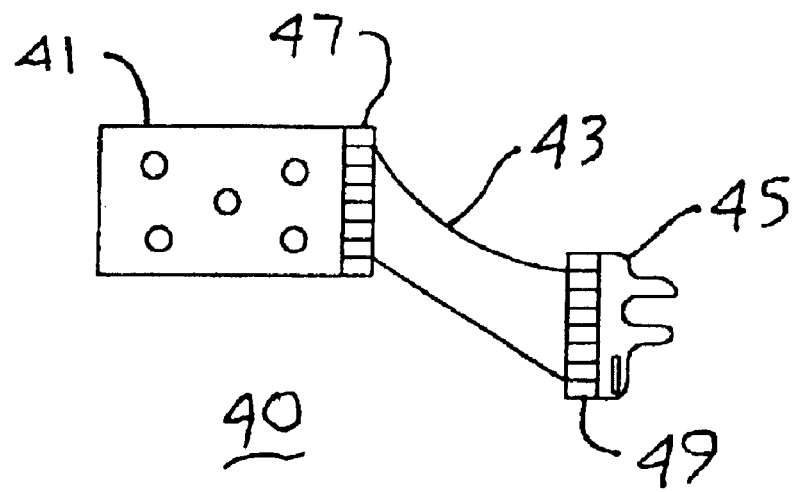
FIG. 5 is an illustrative top view diagram of the rear stabilizer assembly of FIG. 1.
Figure 6:
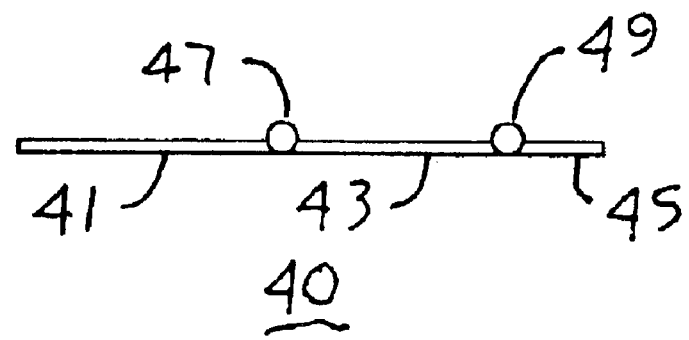
FIG. 6 is an illustrative front view diagram of the rear stabilizer assembly of FIG. 1.

The rear stabilizer assembly 40 is shown in greater detail in FIGS. 5 and 6. FIG. 5 is a top view of the rear stabilizer assembly 40, and FIG. 6 is a side view of the rear stabilizer assembly 40. The rear stabilizer assembly 40 includes a body section 41, a transfer section 43, and a drop out section 45. The body section 41 is connected to the transfer section 43 by a hinge 47, and the transfer section 43 is connected to the drop out section 45 by a hinge 49. The drop out section 45 is attached to a rear wheel 17 of the bicycle 10 at the bicycle axle near the derailleur drop out and the derailleur-side chain stay. The body section 41 is attached to a lower surface 21b of the support body assembly 21. As can be appreciated by one skilled in the relevant art, the length of the transfer section 43 is selected to provide for the minimum safe spacing between the support body assembly 21 and the bicycle 10.

Figure 7:
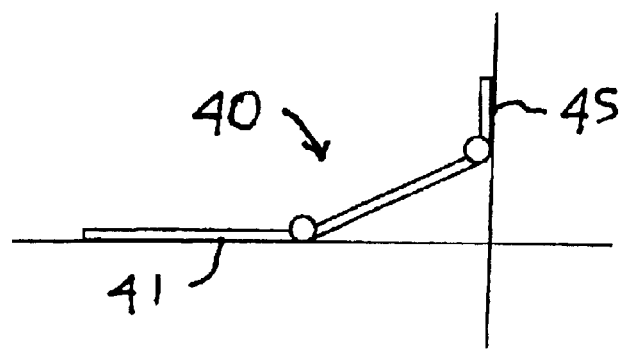
FIG. 7 is a front view of the rear stabilizer assembly of FIG. 1 in a first position.
Figure 8:
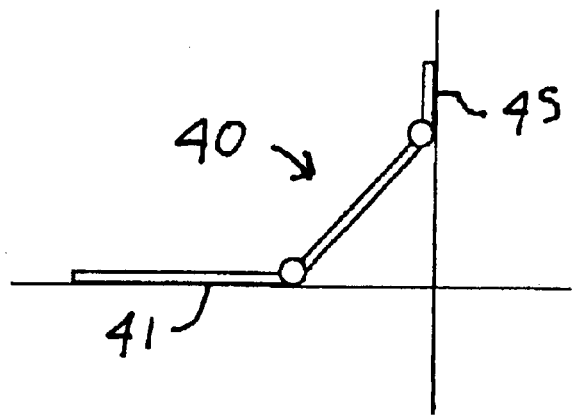
FIG. 8 is a front view of the rear stabilizer assembly of FIG. 1 in a second position.
Figure 9:
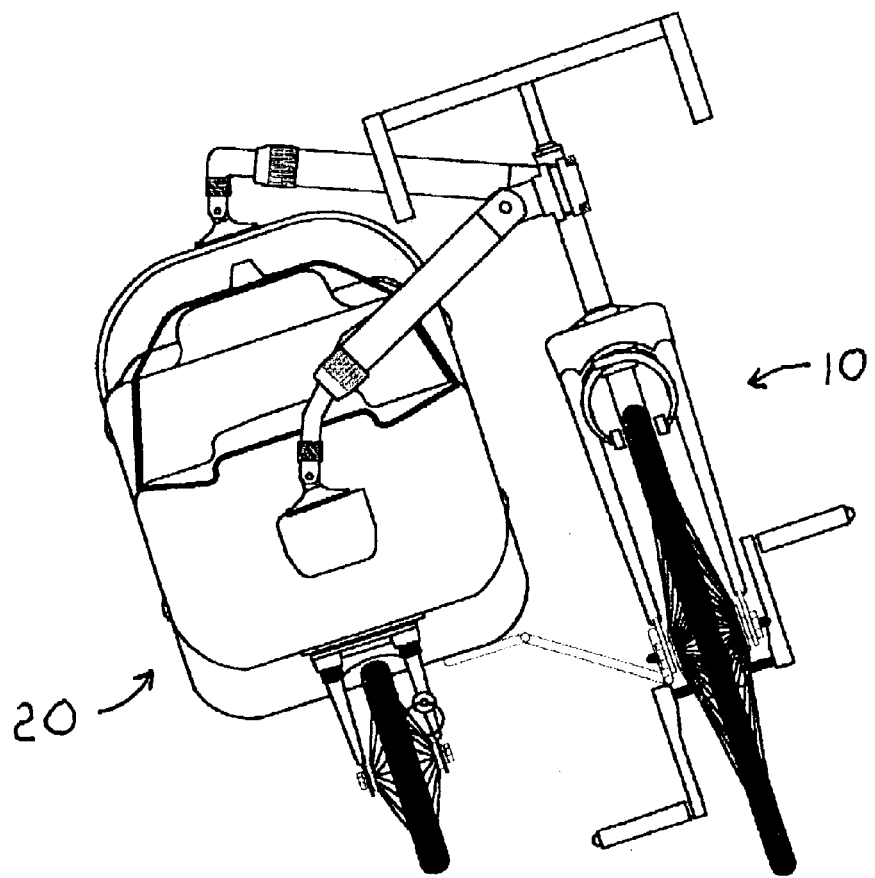
FIG. 9 is a front view of the bicycle and sidecar of FIG. 1 in a turning configuration.
Figure 10:
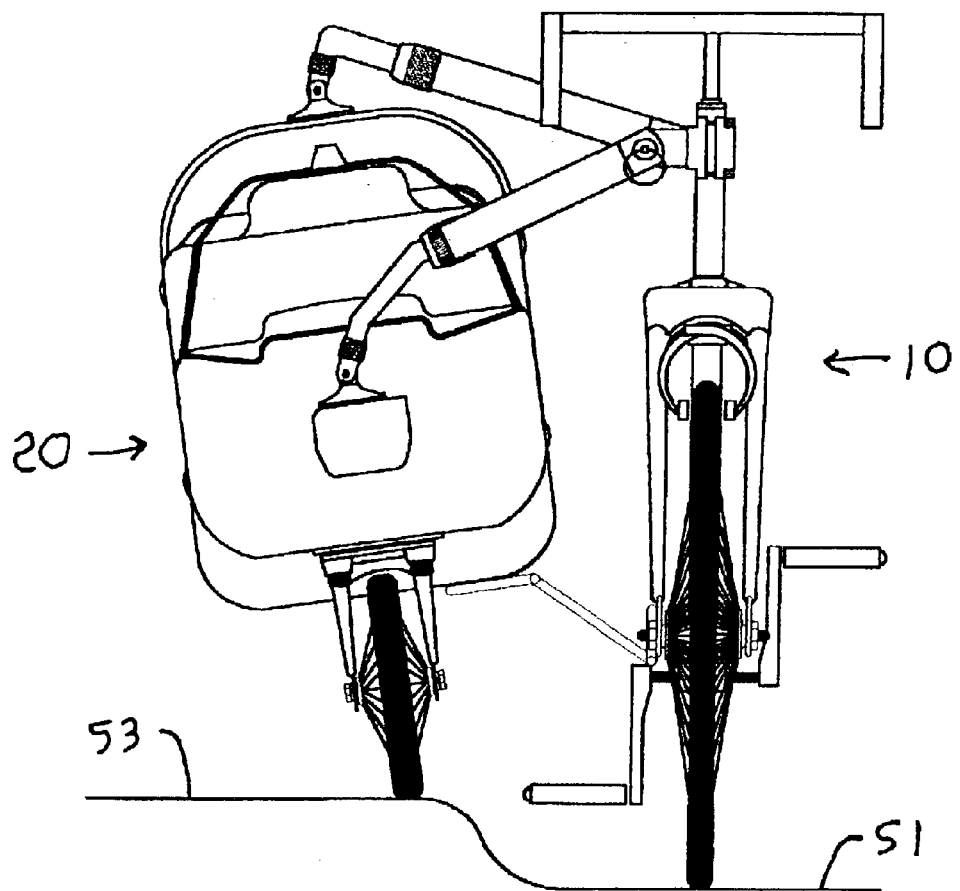
FIG. 10 is a front view of the bicycle and sidecar of FIG. 1 on uneven terrain.

Operation of the rear stabilizer assembly 40 is illustrated by the diagrams of FIGS. 7 and 8. As the support body assembly 21 moves relative to the bicycle 10, the relative position of the body section 41 to the drop out section 45 changes, but the body section 41 continues to maintain a 90° angle to the drop out section 45. This can be seen in FIG. 9, where the bicycle 10 and the sidecar assembly 20 are in the process of turning, and in FIG. 10, where the bicycle 10 is riding on a roadway surface 51 and the sidecar assembly 20 is riding on a raised surface 53 such as a curb.

In an alternative configuration (not shown), one or both of rear actuator arm assembly 31 and the front actuator arm assembly 35 comprises a ball joint connection instead of a hinge, or other such universal-joint type connections, at the support body 21. In yet another alternative configuration, the front actuation arm assembly 35 is not used when geometric restraints will not allow the front actuation arm head tube brackets (not shown) to fit properly. Preferably, the rear stabilizer assembly 40 is sufficiently strong to withstand the resultant torque loading sustained without the presence of the front actuation arm assembly 35.

Figure 11:
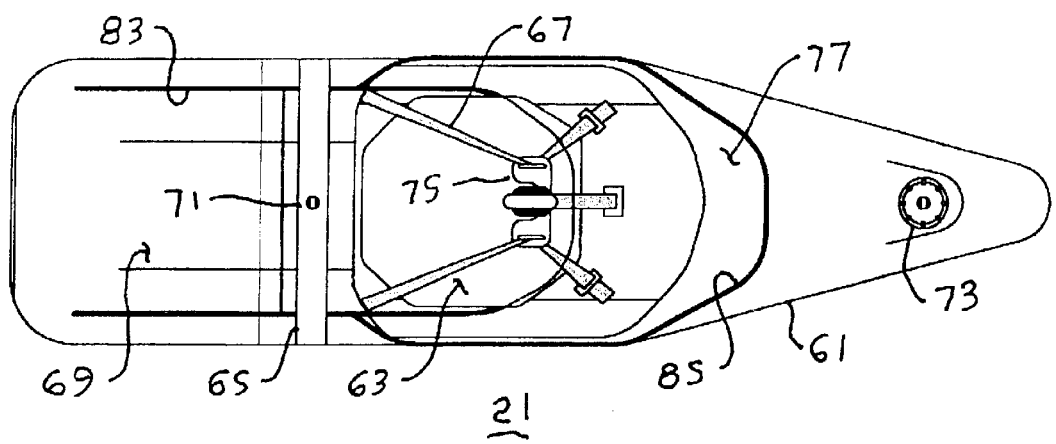
FIG. 11 is a diagrammatic top view of a support body assembly as used in the sidecar of FIG. 1.
Figure 12:
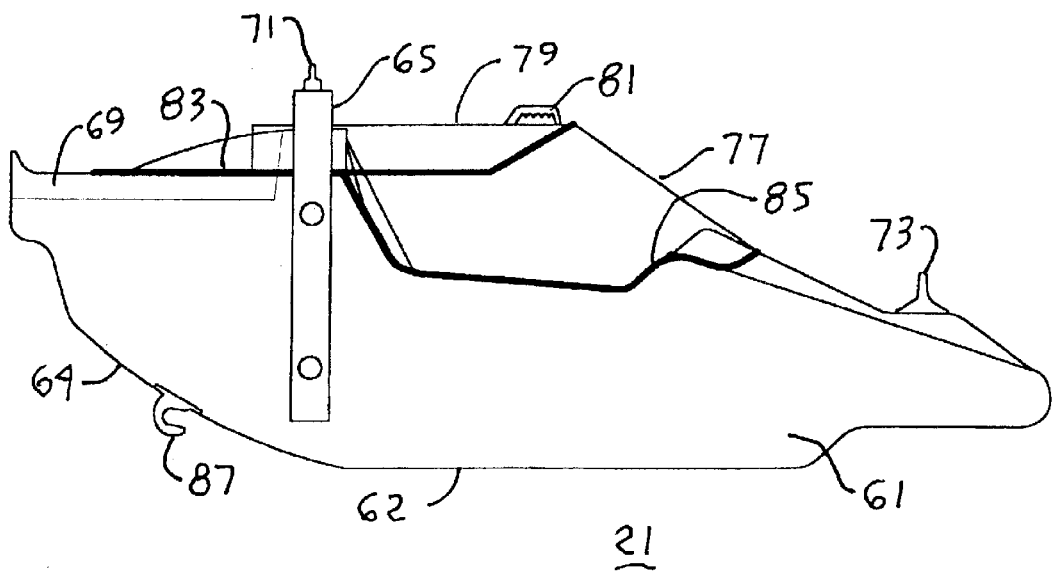
FIG. 12 is a diagrammatic side view of the support body assembly of FIG. 11.

As shown in FIGS. 11 and 12, the support body assembly 21 comprises a body shell 61 that incorporates structural support members as part of the body. In a preferred embodiment, polyethylene is used for the body shell 61, but any comparable material such as fiberglass, carbon fiber, or any number of plastics can be used. An alternative support body assembly (not shown) can be used that requires a separate frame to provide the necessary rigidity. A bottom surface 62 of the support body assembly 21 is located below the center of the axle of the rear body wheel 23, with the back of a height-adjustable passenger seat 63 forward of the rear body wheel 23. This configuration provides a low center of gravity for the mass of both the sidecar assembly 20 and a seated passenger (not shown). This positioning of the support body 21 assembly serves to distribute the body/passenger load directly onto the rear body wheel 23 and a front caster assembly 25 and thereby relieves direct weight load onto the bicycle 10. Moreover, the support body assembly 21 can be internally modified to accommodate two children without changing the overall exterior dimensions. Alternatively, the support body assembly 21 can be designed to accommodate a disabled adult by extending the overall length and width of the mid-section of the support body assembly 21.

The support body assembly 21 preferably also includes a roll bar 65, a five-point adjustable safety harness or seat belt system 67, and a rear storage compartment (not shown) beneath a rear storage deck lid 69. A roll bar hinge assembly 71 is provided on the roll bar 65, and a nose hinge assembly 73 is provided on the nose of the support body assembly 21 for attachment to respective mating hinge components on the articulation system 30, as described above.

Cinch blocks 75 may be provided for adjustment of the five-point seat belt system 67. Also, there may be included a windshield 77, a removable canopy 79, an underbody storage compartment (not shown), and front and rear lighting systems (not shown) to provide night visibility. The canopy 79 can be removed by grasping a canopy release/handle 81 and sliding the canopy 79 rearward on a canopy guide rail 83. The windshield 77 can be removed by detaching from a windshield rail 85. A pair of rear wheel dropouts 87 connected to a rear base 64 of the body shell 61 are used for attachment of the rear wheel assembly 23.

There are two design criteria invoked when determining positioning and attachment of the sidecar assembly 20 to the bicycle 10, as shown in FIGS. 1 and 2. First, that there is sufficient clearance for the bicycle pedal 13 on the sidecar side of the bicycle 10 to allow for normal pedal rotation while both the sidecar assembly 20 and the bicycle 10 are leaning into a turn. Second, that there is sufficient clearance between the bicycle 10 and the front end of the support body assembly 21 so that at no time will the support body assembly 21 come into contact with the front bicycle wheel 15 during normal operation. As long as these two design criteria are met, the support body assembly 21 can be attached in essentially any position beside the bicycle 10. It can be appreciated by one skilled in the relevant art that some bicycle/sidecar configurations result in reduced commanded responses because the lag time of the required response from the sidecar has been increased.

Figure 13:
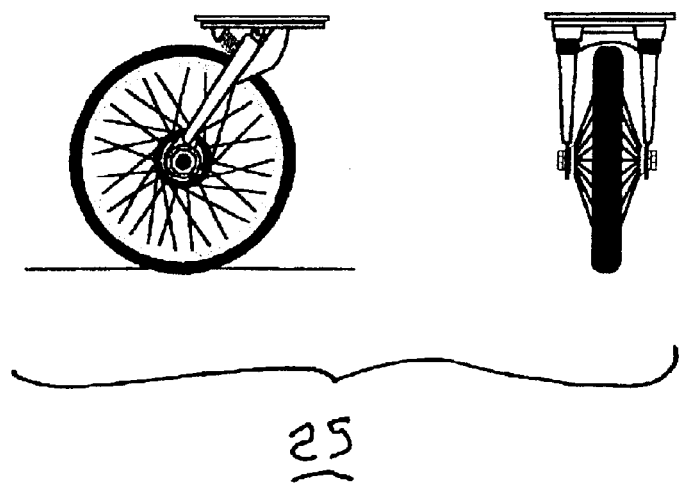
FIG. 13 is a diagrammatical illustration showing side and front views of a preferred embodiment of the front caster assembly for the sidecar of FIG. 1.

As shown in FIG. 13, the front caster assembly 25 is preferably a "trailing" caster design in a "leading" caster position. The front caster assembly 25 can be attached to the support body assembly 21 in any manner known in the art, including the use of bolts, lock washers or a thread-locking compound (such as a Loctite® product), and threaded inserts thermally bonded to the support body assembly 21. Although a generic trailing caster assembly can be used for the front caster assembly 25, a modified R. T. Laird model 33 aluminum shock-absorbing caster modified to hold a 12-inch diameter, 2-inch wide bicycle wheel is preferred. The shock-absorbing caster increases the effective size of the 12-inch wheel to provide a smoother ride. A smaller, thinner wheel can be used in the suspension assembly, but will inherently provide less cushion against the shocks of potholes, bumps, and cracks. Moreover, there will result some loss of response when riding over soft or sand shoulders on the road.

As shown in FIG. 1, the rear body wheel 23 is preferably a standard 27-inch bicycle wheel. As described above, the rear body wheel 23 is connected to the support body assembly 21 by the pair of rear-wheel dropouts 87. As can be appreciated by one skilled in the relevant art, the rear wheel dropouts 87 can be bolted directly to the support body assembly 21 by the use of bolts, lock washers or a thread-locking compound, and threaded inserts thermally bonded to the body assembly 21.

The support body assembly 21 is further aerodynamically designed to produce a downward force at the nose, the downward force increasing with increased riding speed. The overall sloping body design of the support body assembly 21 provides for a downward force primarily to the front caster assembly 25, and a rear spoiler 89 provides for a downward force primarily to the rear body wheel 23. By varying the diameters of the front caster assembly 25 or the rear body wheel 23, these downward forces can be modified to increase or decrease the lift caused by the air while the sidecar assembly 20 is in motion. The rear body wheel 23 and the front caster assembly 25 are parallel, to the wheels 15 and 17 of the bicycle 10 while traveling along a straight, level line. Because the turning radius for the sidecar assembly 20 is different from the turning radius of the bicycle 10, the axis of the sidecar assembly 20 changes from that of the bicycle 10 during turns. This radial difference is compensated for by the front caster assembly 25, which is allowed to "free wheel".

Figure 14:
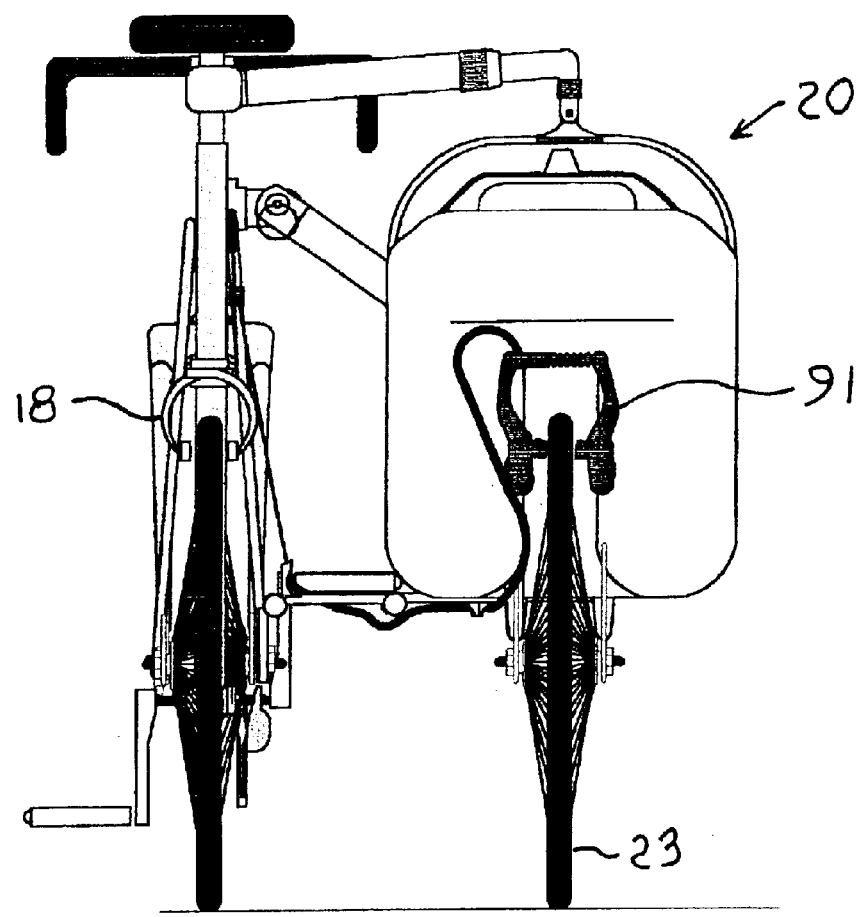
FIG. 14 is an illustrative diagram showing a rear view of the bicycle and the sidecar of FIG. 1 with an optional sidecar braking assembly.

In an alternative embodiment, shown in FIG. 14, a braking system 91 is included on the rear body wheel 23 of the sidecar assembly 20. The braking system 91 can be activated with the same mechanism used to apply a brake 18 on the bicycle 10.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. A sidecar assembly suitable for attachment to a mobile device, said sidecar assembly comprising:
    a support body assembly having an upper surface and a lower surface;
    a rear actuator arm assembly, said rear actuator arm assembly hingedly attached to said support body upper surface, said rear actuator arm further releasably attached to the mobile device;
    a front actuator arm assembly, said front actuator arm assembly hingedly attached to said support body upper surface, said front actuator arm further releasably attached to the mobile device;
    a rear stabilizer assembly including;
        a body section attached to said support body lower surface,
        a transfer section, said transfer section hingedly attached to said body section, and
    a drop out section, said drop out section hingedly attached to said transfer section, said drop out section further releasably attached to the mobile device.

* * * * *